(12) United States Patent
Kotonska (10) Patent No.: US 10,798,918 B2
(45) Date of Patent: Oct. 13, 2020

(54) METHODS OF GROOMING HORSES AND ASSOCIATED APPARATUS

(71) Applicant: Eqclusive LTd, Glasgow (GB)

(72) Inventor: Marta Kotonska, Aberdeen (GB)

( * ) Notice: Subject to any disclaimer, the term of this patent is extended or adjusted under 35 U.S.C. 154(b) by 411 days.

(21) Appl. No.: 15/669,549

(22) Filed: Aug. 4, 2017

(65) Prior Publication Data

US 2018/0035642 A1 Feb. 8, 2018

Related U.S. Application Data

(60) Provisional application No. 62/371,514, filed on Aug. 5, 2016.

(51) Int. Cl.
*A01K 13/00* (2006.01)
*A01K 11/00* (2006.01)

(52) U.S. Cl.
CPC .......... *A01K 13/002* (2013.01); *A01K 11/006* (2013.01)

(58) Field of Classification Search
CPC ................ A01K 13/00; A01K 13/001–13/003
USPC .......................................................... 119/600
See application file for complete search history.

(56) References Cited

U.S. PATENT DOCUMENTS

| | | | | | |
|---|---|---|---|---|---|
| 4,343,265 | A | * | 8/1982 | Belschner | A01K 13/002 119/625 |
| 5,326,099 | A | * | 7/1994 | Yamamoto | A63B 53/10 473/315 |
| 5,690,057 | A | * | 11/1997 | Curry | A01K 13/002 119/623 |
| 5,960,745 | A | * | 10/1999 | Boyland | A01K 13/002 119/613 |
| 6,510,816 | B2 | * | 1/2003 | Ehrmann | A01K 13/002 119/601 |

* cited by examiner

*Primary Examiner* — Richard T Price, Jr.
(74) *Attorney, Agent, or Firm* — Dorton & Willis, LLP; Ryan Willis (57) ABSTRACT

A method of grooming a horse including selecting a grooming kit according to a horse attribute. The method involves selecting a grooming kit according to a horse attribute, the horse attribute being categorized according to a categorization scheme. The categorization scheme has a plurality of categories including: a first category corresponding to a gray or white horse coat type; a second category corresponding to a light bay or chestnut horse coat type; and a third category corresponding to a black or dark bay horse coat type. A prescribed sequential grooming regime is followed according to the categorization of horse and the selected grooming kit. Each of the grooming kits has a specific combination of brush types for a sequential order of brushing steps.

20 Claims, 10 Drawing Sheets

METHODS OF GROOMING HORSES AND ASSOCIATED APPARATUS

CROSS REFERENCE TO RELATED APPLICATIONS

The present application claims the benefit of U.S. Provisional Patent Application Ser. No. 62/371,514, titled "METHODS OF GROOMING HORSES AND ASSOCIATED APPARATUS," filed Aug. 5, 2016, the disclosure of which is incorporated herein by reference.

BACKGROUND

Domestic horses can require regular grooming for various reasons. Grooming can maintain or improve the health of the coat and skin. Whereas wild horses may be able to groom themselves or each other, such as by rolling, rubbing, rain-washing and mutual oral grooming, domestic horses may require manual grooming by a handler.

In addition to cleaning the horse, manual grooming can also provide an opportunity for the handler to inspect the horse and build or reinforce a relationship between the horse and the handler, which may be useful for training. Particularly where the horse is groomed regularly over a period of time, the horse can appreciate the effects of grooming, such as massage and the reduction or prevention of irritations, such as chafing in areas under tack.

Where a horse is groomed properly, the coat may be cleaner and have a shinier appearance—which may also be desirable for shows or competitions. Without proper grooming, a horse may be more susceptible to health problems, such as fungal infections, scratches and other skin issues.

To obviate problems of the prior art, it would be desirable to provide an appropriate and proper grooming for horses. The subject matter of at least some examples of the present disclosure may be directed to overcoming, or at least reducing the effects of, one or more of the problems of the prior art, such as set forth above.

INTRODUCTION TO THE INVENTION

The present disclosure is directed to methods for grooming horses and associated apparatus.

According to a first aspect, there is provided at least one example of a method of grooming a horse. Preferably the method comprises selecting a grooming kit according to a horse attribute. The horse attribute may correspond to a horse coat attribute, such as a hair thickness or length or a coat thickness. Preferably the horse attribute comprises a coat color of the horse.

The horse attribute may be categorized according to a categorization scheme, the scheme comprising a plurality of categories. A first category may correspond to a gray or white horse coat color or type. The first category may comprise horses that have tough or coarse hair when brushed in one direction, such as against the hair; and soft or smooth hair when brushed in an opposite direction, such as against the hair. A second category may correspond to a light bay or chestnut horse coat color of type. The second category may comprise horses that have hair that is soft or smooth when brushed in both directions, such with and against the hair. A third category may correspond to a black or dark bay horse coat color or type. The third category may comprise horses that have tough or coarse hair when brushed in both directions, such as both with and against the hair.

In at least some examples the method comprises following a prescribed sequential grooming regime according to the categorization of horse.

According to a further aspect there is provided at least one example of a horse grooming kit. In at least some examples, the horse grooming kit comprises a kit particular to a specific category of horse.

In at least some embodiments, the grooming kit may comprise a kit selected from: a grey/white horse grooming kit; a light bay/chestnut grooming kit; and a black/dark bay grooming kit.

Preferably each kit comprises a plurality of different types of brush. In at least some examples, each kit comprises at least two; at least three; and preferably at least four or at least five different types of brush. Each kit may comprise an appropriate number of different types of brush as prescribed for that particular category of horse.

Each kit may comprise a set of instructions. Preferably each kit comprises a particular set of instructions for use of that particular kit. The instructions may prescribe the method of any other aspect, embodiment or example described herein. The set of instructions may be comprised on a suitable medium, such as printed matter, an electronic media carrier, or remotely accessible such as via internet and/or e-mail. The instructions may comprise materials selected from one or more of: printed matter; text; illustration; photograph; film footage; animation; audio commentary.

According to a further aspect there are provided at least some examples of an array of horse grooming kits. The array may comprise the horse grooming kit or kits of any other example, aspect or embodiment described herein.

The array may include a plurality of kits for performing at least one of the methods of horse grooming described herein. The array may include a plurality of different types of kits for grooming a plurality of horses, the plurality of horses being in different categories.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the kit or brush of one aspect may comprise features of any other aspect). Optional features as recited in respect of a method may be additionally applicable to an apparatus; and vice versa.

In addition, corresponding means for performing one or more of the discussed functions are also within the present disclosure.

It will be appreciated that one or more embodiments/aspects/examples may be useful in grooming a horse, or in grooming a variety of different categories of horse.

The above summary is intended to be merely exemplary and non-limiting.

DETAILED DESCRIPTION

The exemplary embodiments of the present disclosure are described and illustrated below to encompass exemplary methods for grooming horses and associated apparatus. Of course, it will be apparent to those of ordinary skill in the art that the embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
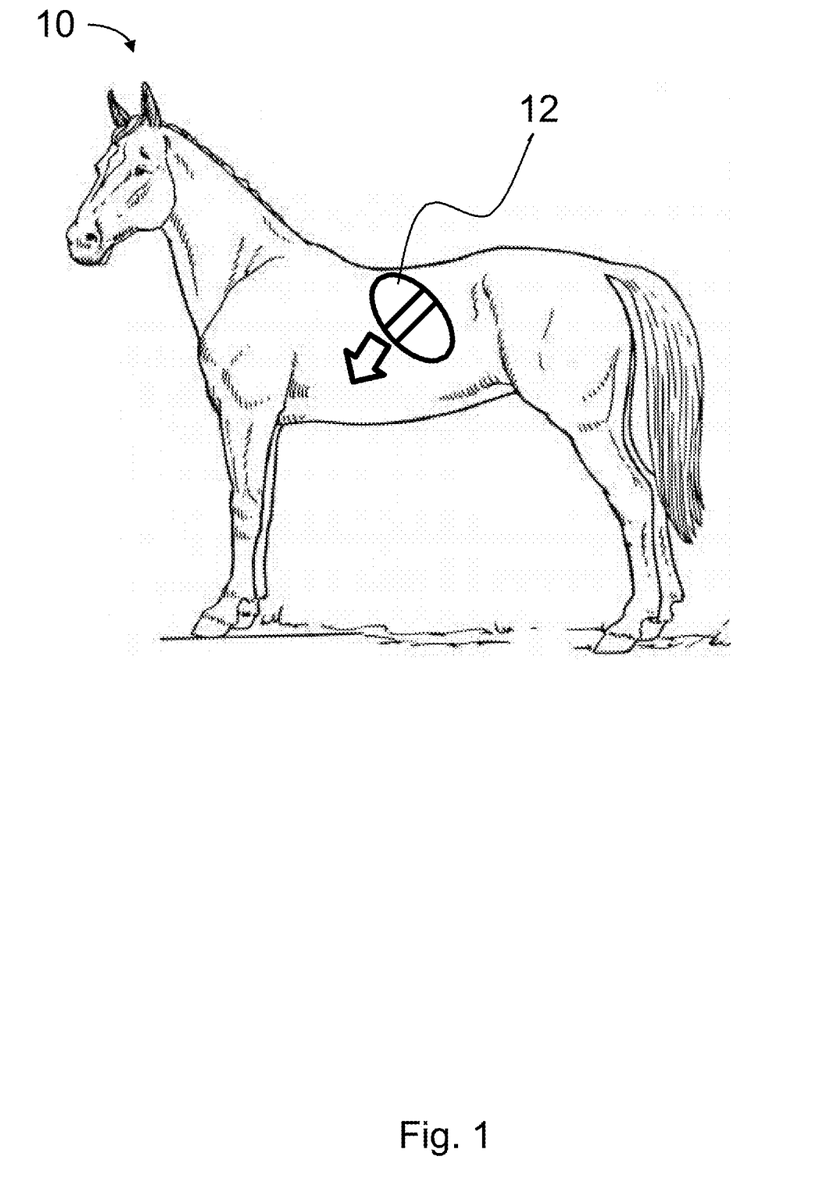
FIG. 1 is a schematic view of a method of grooming a horse.

Referring to FIG. 1, there is shown a method of grooming a horse 10. As shown here the method comprises brushing the body of the horse 10 using a manual brush 12. It will be appreciated that the brush 12 is rubbed over the body of the horse 10 with the hair, against the hair or across the hair as appropriate, as described in further detail below.

Figure 2:
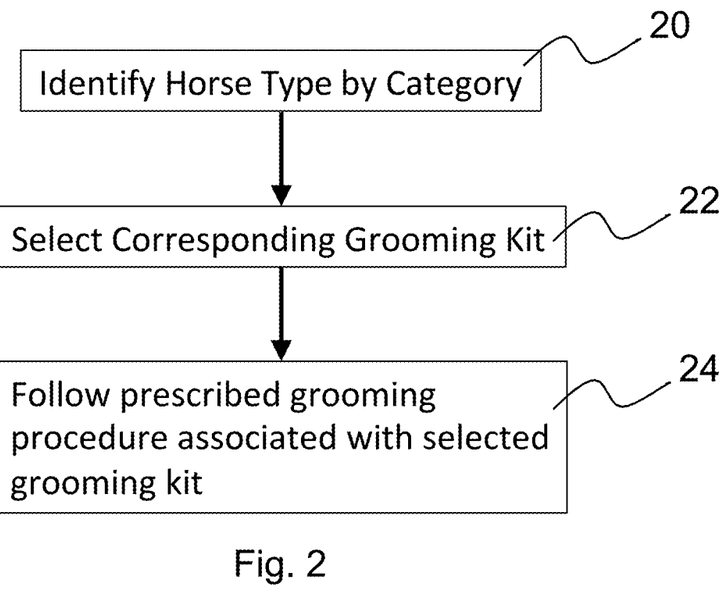
FIG. 2 is a flow chart depicting a method of grooming a horse in accordance with an example of the present disclosure.

Referring to FIG. 2, there is shown a flow chart depicting a method of grooming a horse. The method comprises the sequential steps 20, 22, 24 of: identifying a type of horse according to a category; selecting a horse grooming kit corresponding to said identified category; and following a prescribed grooming procedure or regime associated with the category of horse and the selected grooming kit.

Preferably, the horse attribute is categorized according to a categorization scheme, the scheme comprising a plurality of categories. In at least some examples, the horse category corresponds to a horse coat attribute, such as a hair thickness or length or a coat thickness. Preferably the horse attribute comprises a coat color of the horse.

A first category may correspond to a gray or white horse coat color. A second category may correspond to a light bay or chestnut horse coat color. A third category may correspond to a black or dark bay horse coat color. It will be appreciated that a user, such as a handler or groomer, may not have a horse of every category. Accordingly, the user may not have a grooming kit for every category. For example, a user with a single horse may only have a single horse grooming kit that can be selected.

The method comprises following a sequential grooming regime 24 with steps according to the categorization of horse. Preferably the method comprises grooming the body of the horse; and generally the method may comprise grooming non-sensitive areas of the horse. Each particular grooming regime 24 specifically targets a problematic area of that horse's type of coat, associated with that category of horse.

Preferably each particular grooming regime 24 comprises an initial brushing step 26a, 26b, 26c with a specified first brush 126, 226, 326 prescribed as an initial brush for that particular grooming regime 24. Preferably at least one of the regimes 24a 24b, 24c comprises a different specified initial brush 126, 226, 326 from the specified initial brush 126, 226, 326 of at least one of the other regimes 24a, 24b, 24c.

Preferably each particular grooming regime 24 comprises a second brushing step 28a, 28b, 28c with a specified second brush 128, 228, 328 prescribed as a second brush for that particular grooming regime 24a, 24b, 24c. Preferably at least one of the regimes 24a 24b, 24c comprises a different specified second brush 128, 228, 328 from the specified second brush 128, 228, 328 of at least one of the other regimes 24a, 24b, 24c.

Preferably each regime 24a, 24b, 24c comprises a unique combination or pair of first and second brushing steps 26a, 28a, 26b, 28b, and 26c, 26c. Accordingly each regime 24a, 24b, 24c, and each kit 110, 210, 310 therefor, comprises a unique combination of first and second sequential brushes 126, 128, 226, 228, and 326, 328. The unique combinations may be particularly suited to the particular category of horse.

Figure 6:
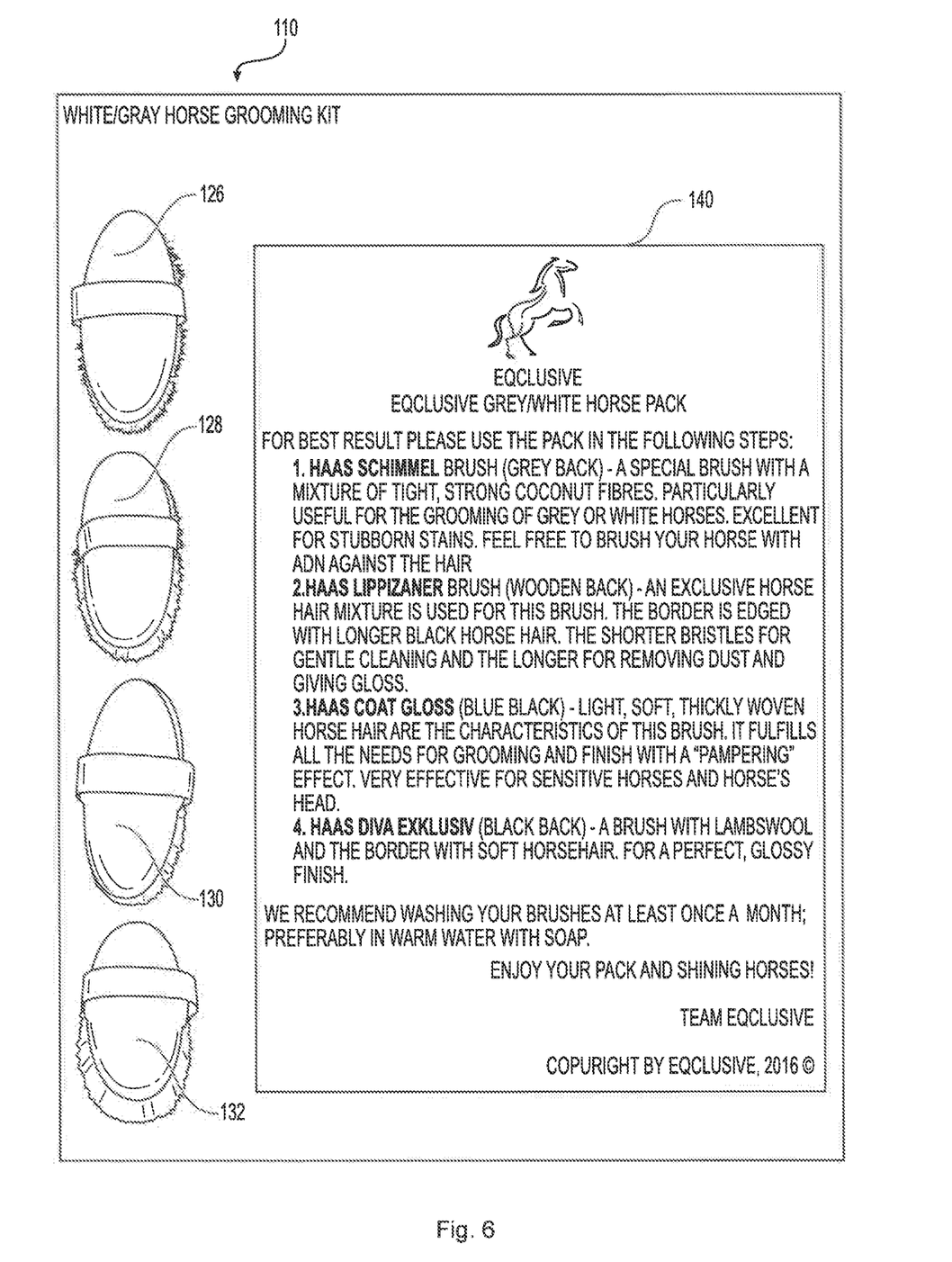
FIG. 6 is a schematic illustration of a kit for grooming a horse of a first category in accordance with an example of the present disclosure.
Figure 7:
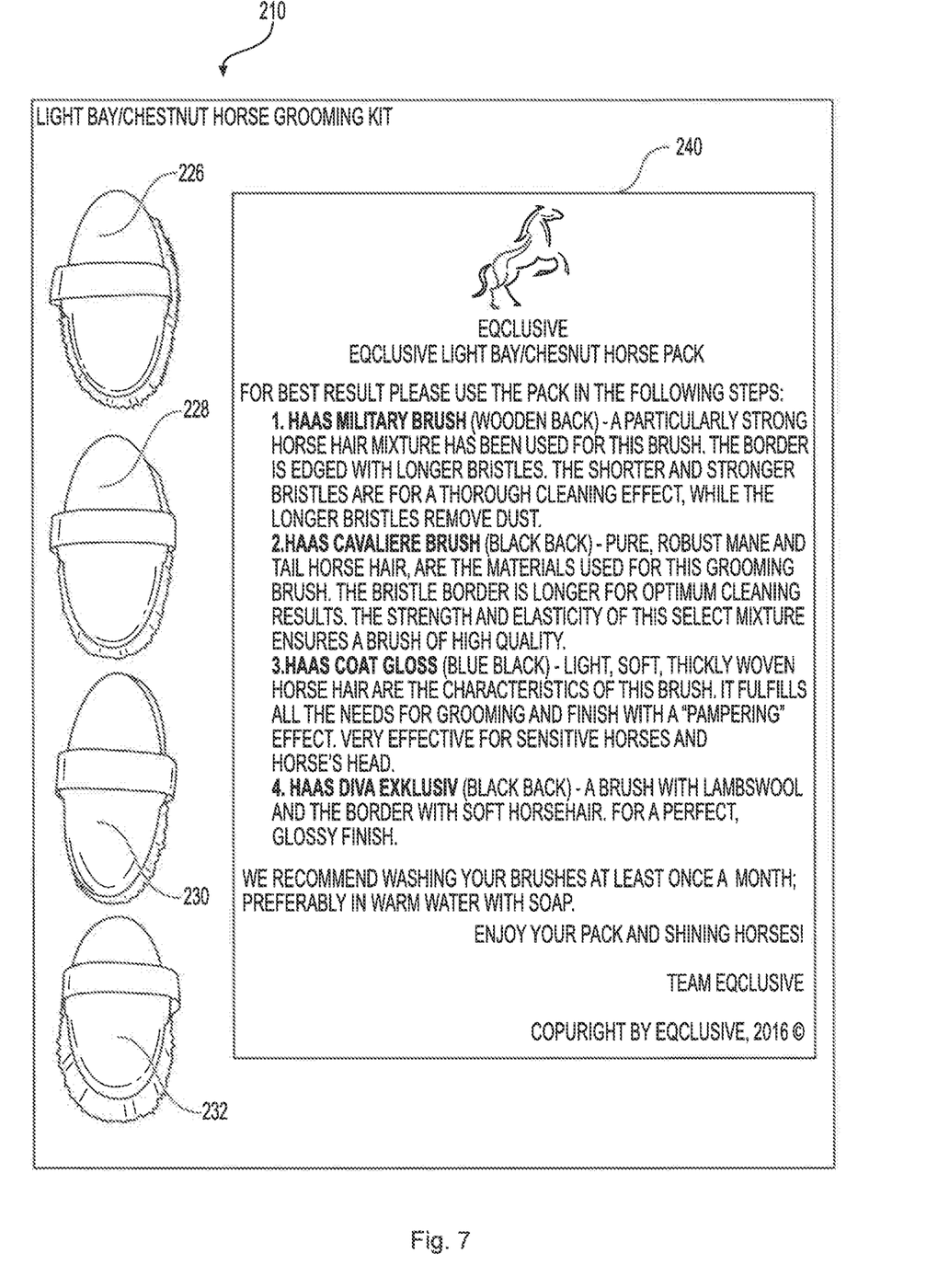
FIG. 7 is a schematic illustration of a kit for grooming a horse of a second category in accordance with an example of the present disclosure.
Figure 8:
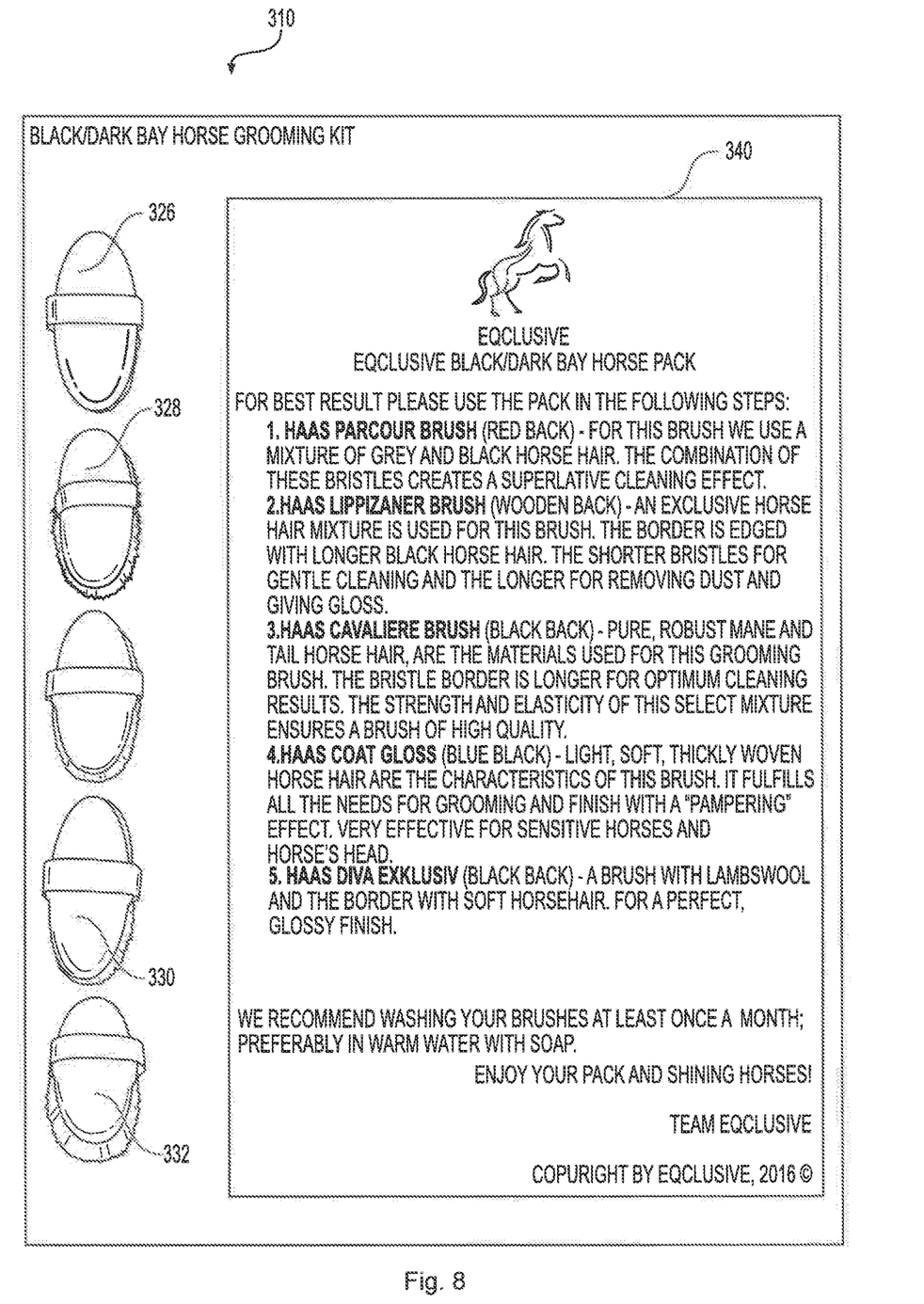
FIG. 8 is a schematic illustration of a kit for grooming a horse of a third category in accordance with an example of the present disclosure.

Preferably each particular grooming regime 24 comprises a penultimate brushing step 30a, 30b, 30c with a specified penultimate brush 130, 230, 330 prescribed as a penultimate brush for that particular grooming regime 24a, 24b, 24c. Preferably at least one of the regimes 24a 24b, 24c comprises a same specified penultimate brush 130, 230, 330 as the specified penultimate brush 130, 230, 330 of at least one of the other regimes 24a, 24b, 24c. More preferably, each regime 24a 24b, 24c comprises the same specified penultimate brush 130, 230, 330 as each of the other regimes 24a, 24b, 24c. Accordingly, as shown in FIGS. 6, 7 and 8, in at least one example, each regime comprises the same specified penultimate brush 130, 230, 330 for each penultimate brushing step 30a, 30b, 30c of each specific grooming regime 24a, 24b, 24c.

Preferably the penultimate brush 130, 230, 330 comprises a finishing brush. Preferably the penultimate brush 130, 230, 330 comprises horse hair bristles. As shown here, the penultimate brush 130, 230, 330 is made purely of gray horses' hair. Preferably the penultimate brush 130, 230, 330 is configured for sensitive horses. Here, the penultimate brush 130, 230, 330 comprises light, soft, thickly woven horse hair. Preferably the penultimate brush 130, 230, 330 provides a pampering effect. The penultimate brush 130, 230, 330 may remove residue in the top coat. The penultimate brush 130, 230, 330 may give a gloss to the horse's coat. Preferably the penultimate brush 130, 230, 330 comprises a coat gloss brush, such as a "Fellglanzbürste" made by Haas Manufaktuur and marketed in 2016 as a coat gloss brush available from Eqclusive Limited.

Preferably each grooming regime 24a, 24b, 24c comprises a yet further step or final brushing step 32a, 32b, 32c of brushing with a specified final brush 132, 232, 332 prescribed as a final brush for that particular grooming regime 24a, 24b, 24c. Preferably at least one of the regimes 24a 24b, 24c comprises a same specified final brush 132, 232, 332 as the specified final brush 132, 232, 332 of at least one of the other regimes 24a, 24b, 24c. More preferably, each regime 24a 24b, 24c comprises the same specified final brush 132, 232, 332 as each of the other regimes 24a, 24b, 24c. Accordingly, as shown in FIGS. 6, 7 and 8, in at least one example, each regime comprises the same specified final brush 132, 232, 332 for each final brushing step 32a, 32b, 32c of each specific grooming regime 24a, 24b, 24c.

Preferably the final brush 132, 232, 332 comprises a polishing brush. Preferably the final brush 132, 232, 332 comprises horse hair bristles. Preferably the final brush 132, 232, 332 comprises lambswool, such as Mates lambwool. Preferably the final brush 132, 232, 332 comprises soft horse hair bristles, such as soft black horse hair. Preferably the final brush 132, 232, 332 comprises a border of bristles of a different type around a periphery of the brushing portion compared to a type of bristles in a central area of the brushing portion. Here, the final brush 132, 232, 332 comprises a lambswool center with a black horse hair border. Preferably the final brush 132, 232, 332 provides a final show ready polish look. The final brush 132, 232, 332 may give a gloss to the horse's coat. Preferably the final brush 132, 232, 332 comprises a finishing or polishing brush, such as a "Diva Exklusiv" or "Exklusiv" brush made by Haas Manufaktur and marketed in 2016 as a "Diva Exklusiv" available from Eqclusive Limited.

Preferably each grooming regime 24a, 24b, 24c comprises brushing the horse with at least two different types of brush configured for a particular breed or type of horse. Rather than merely brushing a horse with a single brush specific to that or one single breed or type of horse, each of the regimes 24a, 24b, 24c preferably comprises brushing the horse with a plurality of types of type-specific brush, each type-specific brush configured for a horse of a different type. Accordingly, each regime 24a, 24b, 24c shown here, and corresponding kit 110, 210, 310, comprises at least two horse-type-specific brushes.

Figure 3:
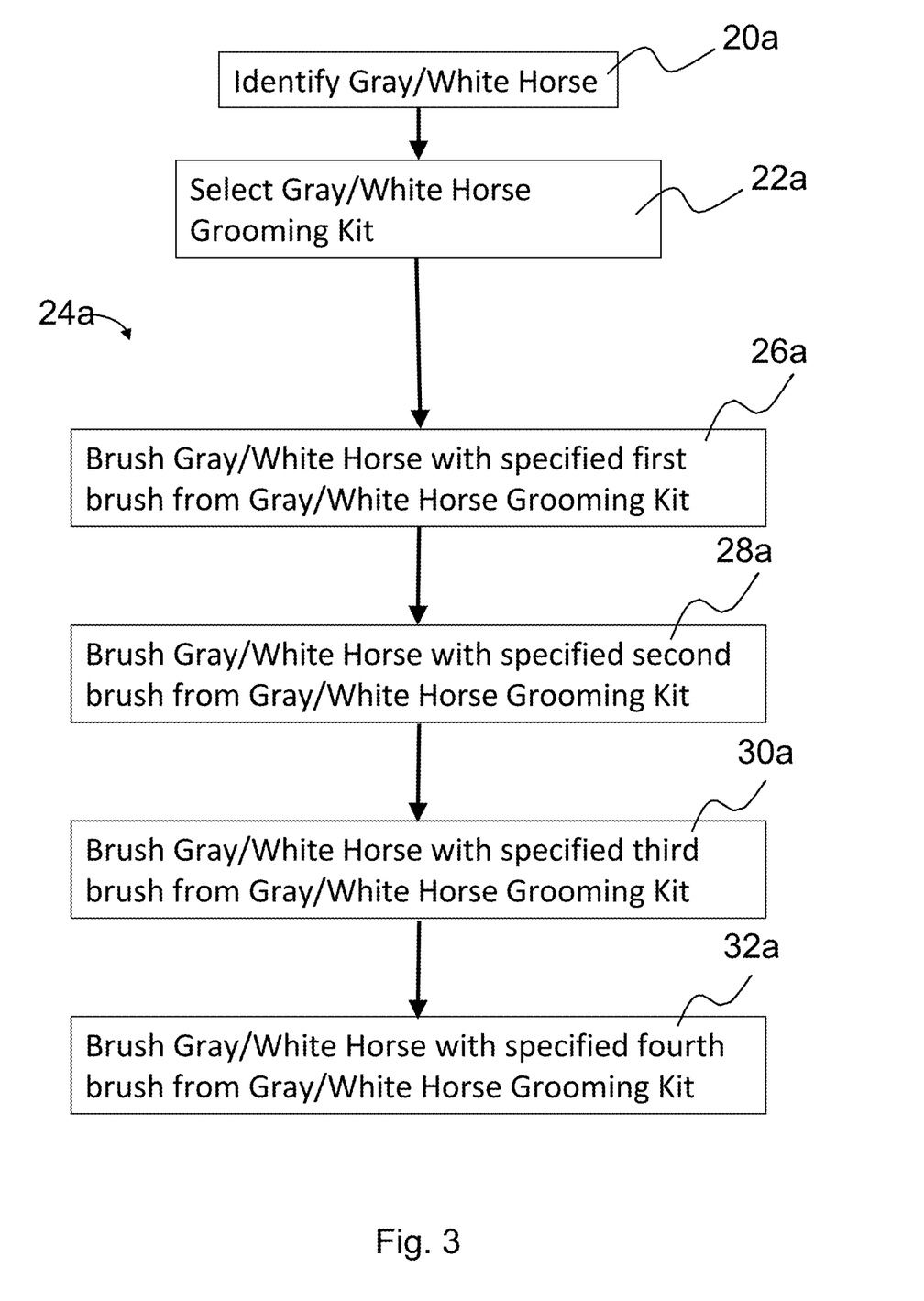
FIG. 3 is a flow chart depicting a method of grooming a horse of a first category in accordance with an example of the present disclosure.

Accordingly, by way of example, the first grooming regime 24a as depicted in FIG. 3, using the kit 110 of FIG. 6, comprises at least four prescribed sequential brushing steps 26a, 28a, 30a, 32a using at least four prescribed particular brushes 126, 128, 130, 132 in a prescribed particular sequential order according to the particular instructions 140 for the first category of horse. As shown in FIG. 3, in at least some examples, the method comprises grooming a horse with a coat corresponding to the first category according to a first grooming regime 24a. Here, the first grooming regime 24a corresponds to a gray/white horse coat grooming regime 24a. As shown in FIG. 3, the first grooming regime 24a comprises brushing the horse sequentially with at least four successive steps 26a, 28a, 30a, 32a with at least four different types of brush 126, 128, 130, 132, as described in detail with reference to FIG. 6. The first grooming regime 24a as shown here is for white or grey colored horses, which tend to have a coat that feels soft, but if you go against it, it can be quite sturdy and stubborn. Such horses' skin is usually not overly sensitive and they appreciate a good scratch. The kit 110 as shown in FIG. 6 is specifically configured for such gray/white colored horses.

Preferably the first brush 126 for the first category of horse for use in the first grooming step 26a of the first grooming regime 24a comprises a stain removal brush. Here the first brush 126 comprises coconut fibres. Preferably the brush bristles comprise a mixture of tight, strong fibres. The specific coconut fibre bristles help to remove stains with minimal effort from the groomer. Preferably the first brush 126 removes all stable and field-related stains. Preferably the first brush 126 for the first grooming step 26a of the first grooming regime 24a comprises a brush specifically configured for gray or white horses, such as a white/gray horse brush made by Haas Manufaktur and marketed in 2016 as a "Schimmel" brush available from Eqclusive Limited. Optionally the first brushing step 24a for horses in the first category comprises brushing with the first category first brush 126 both with and against the hairs of the horse (i.e. both with and against the longitudinal direction or grain of the horse's hair).

Preferably the second brush 128 for the first category of horse for use in the second grooming step 28a of the first grooming regime 24a comprises a residue removal brush. Preferably the second brush 128 for the first category of horse comprises at least two different types of bristles. Here the second brush 128 comprises black horse hair bristles and/or brown/gray horse hair bristles. Preferably the second brush 128 for the first category of horse comprises bristles of at least two different lengths. Here, the second brush 128 for the first category of horse comprises a border of bristles of longer black horse hair around a periphery of the brushing portion compared to shorter gray and brown horse hair bristles in a central area of the brushing portion within the border. Preferably the second brush 128 cleans both the undercoat and top coat. Here, the shorter bristles may provide for a gentle cleaning and the longer bristles may provide for removal of dust and giving gloss to the horse's coat. Preferably the second brushing step 28a of the first grooming regime 24a removes sweat, sweat combined with oil and really clears the skin underneath the coat. The second brushing step 28a of the first grooming regime 24a may cause the horse to appear lighter in color afterwards, such as due to the removal of a lot of residue underneath the coats that gray/white colored horses may have.

Preferably the second brush 128 for the second grooming step 28a of the first grooming regime 24a comprises a brush specifically configured for another breed, sub-breed or type of horse, such as differently configured from the first brush 126 for the first category of horse. Preferably the second brush 128 is configured for a Lippizaner type of horse, such as a Lippizaner horse brush made by Haas Manufaktur and marketed in 2016 as a "Lippizaner" brush available from Eqclusive Limited. Whereas, a white/gray horse brush, such as the "Schimmel" brush may conventionally be used singularly to groom a horse; or a Lippizaner horse brush may conventionally be used singularly to groom a Lippizaner horse; the grooming regime 24a here preferably prescribes using both a white/gray brush and a Lippizaner brush on all gray/white horses, and preferably in the sequential order as described above. Furthermore, the regime 24a and corresponding kit 110 preferably prescribe in the instructions 140 two additional sequential brushing steps 30a, 32a with two additional different types of brush 130, 132. Following such a prescribed regime 24a can lead to improved grooming results, such as a cleaner or shinier horse coat; and/or grooming results with a reduced effort or reduced time required.

In at least some examples, in addition to brushing with the first and second brushes 126, 128, the first grooming regime 24a for the first category of horse comprises the penultimate brushing step 30a of brushing with the finishing brush 130 and the final brushing step 32a of brushing with the polishing brush 132. Accordingly, the first grooming regime 24a preferably comprise at least four specific grooming steps 26a, 28a, 30a, 32a with at least four prescribed specific brushes 126, 128, 130, 132. The first grooming regime 24*a* is specifically adapted for horses that have tough or coarse hair when brushed in one direction, such as against the hair; and soft or smooth hair when brushed in an opposite direction, such as against the hair.

Figure 4:
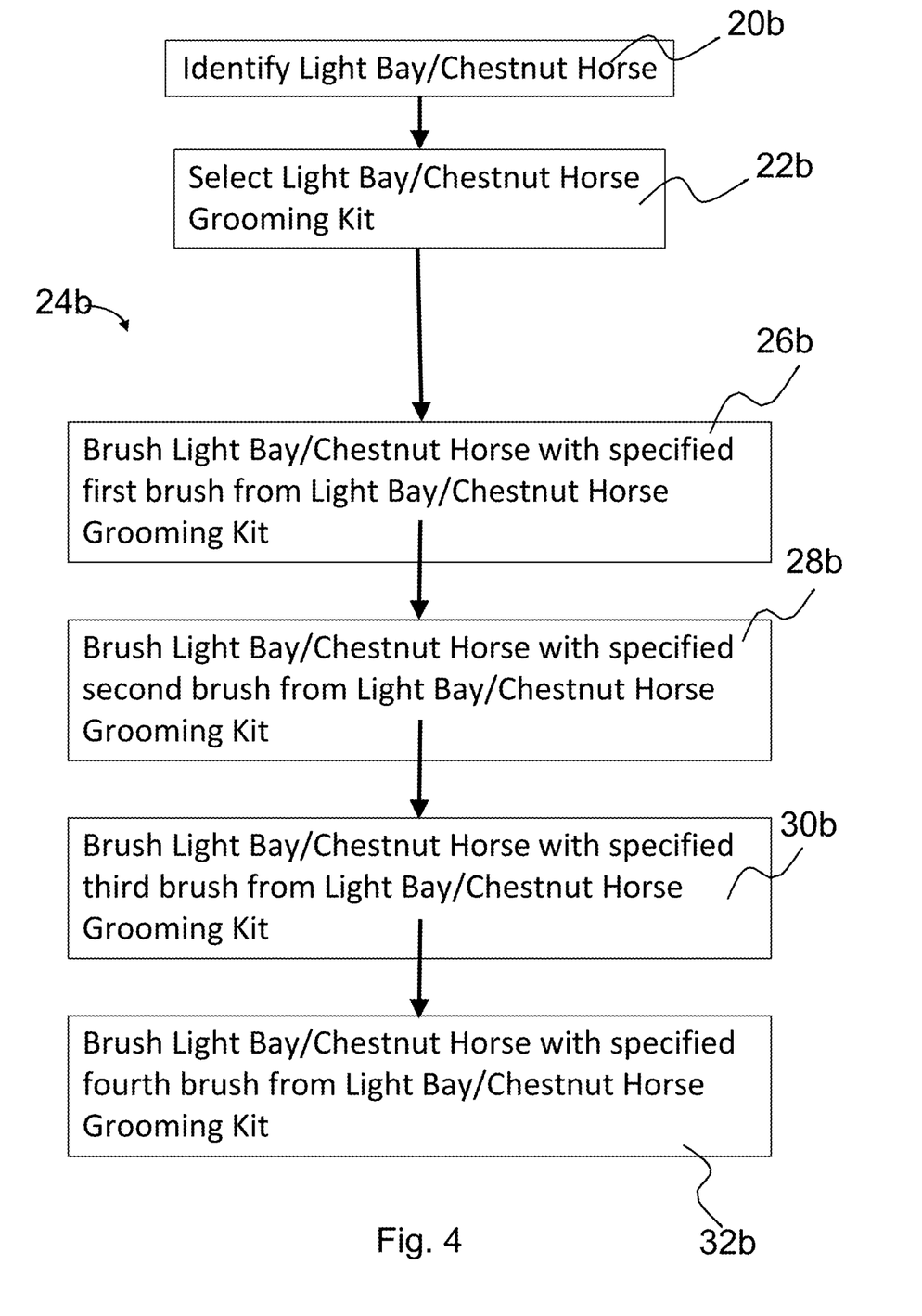
FIG. 4 is a flow chart depicting a method of grooming a horse of a second category in accordance with an example of the present disclosure.

As shown in FIG. 4, at least some examples of the method comprise grooming a horse with a coat corresponding to the second category according to a second grooming regime 24*b*. Here, the second grooming regime 24*b* corresponds to a light bay/chestnut horse coat grooming regime 24*b*. The second grooming regime 24*b* comprises brushing the horse sequentially with at least four successive steps 26*b*, 28*b*, 30*b*, 32*b* with at least four different types of brush 126, 128, 130, 132 as described in detail below with reference to FIG. 7, in accordance with the instructions 240 included with the kit 210. Referring to FIG. 7, there is shown a horse grooming kit 210 generally similar to that 110 shown in FIG. 6. Similar features are denoted by similar reference numerals incremented by 100. Accordingly, the second grooming kit 210 comprises a penultimate brush 230 and a final brush 232.

Preferably the first brush 226 for the second category of horse for use in the first grooming step 26*b* of the second grooming regime 24*b* comprises a dust removal brush. In at least some examples, the first brush 226 comprises a particularly strong horse hair mixture. Preferably the first brush 226 for the second category of horse comprises at least two different types of bristles. Here the first brush 226 comprises brown and/or black horse hair bristles. Preferably the first brush 226 for the second category of horse comprises bristles of at least two different lengths. Here, the first brush 226 for the second category of horse comprises a border of bristles of longer black/brown horse hair around a periphery of the brushing portion compared to shorter black/brown horse hair bristles in a central area of the brushing portion within the border. In at least some examples, the shorter and stronger bristles in the central area provide for a thorough cleaning effect, while the longer bristles remove dust. Preferably the first brush 226 for the second category of horse for the first grooming step 26*b* of the second grooming regime 24*b* comprises a horse brush made by Haas Manufaktur and marketed in 2016 as a "Military" brush available from Eqclusive Limited. Preferably the first grooming step 26*b* of the second grooming regime 24*b* with the first grooming brush 226 removes the dust and dirt from underneath the coat. Preferably, the first brush 226 for the second category of horse removes dust, right from the skin, even after a single strike of this brush 226 due to the softness of the bristles. The first brush 226 for the second category of horse grabs a soft coat and ensures deep cleaning effects of a horse of the second category.

Preferably the second brush 228 for the second category of horse for use in the second grooming step 28*b* of the second grooming regime 24*b* comprises a dirt removal brush. Preferably the second brush 228 for the second category of horse comprises at least two different types of bristles. Here the second brush 228 for the second category comprises black horse hair bristles and white/gray horse hair bristles. In at least some examples, the second brush 228 comprises both mane and tail horsehairs. Preferably the second brush 228 for the second category of horse comprises bristles of at least two different lengths. Here, the second brush 228 for the second category of horse comprises a border of bristles of longer white/gray horse hair around a periphery of the brushing portion compared to shorter black horse hair bristles in a central area of the brushing portion within the border. In at least some examples, the second brush 228 used in the second grooming step 28*b* of the second grooming regime 24*b* removes the dirt that was brought up by the previous brush 226 to the top coat. Optionally the second brush 228 for the second category cleans both the undercoat and top coat. In at least some examples, the shorter bristles may provide for a gentle cleaning and the longer bristles may provide for removal of dust and giving gloss to the horse's coat. Preferably the second brush 228 for the second category of horse for the second grooming step 28*b* of the second grooming regime 24*b* comprises a horse brush made by Haas Manufaktur and marketed in 2016 as a "Cavaliere" brush available from Eqclusive Limited.

The second grooming regime 24*b* and associated second grooming kit 210 are preferably specifically configured for light bay/chestnut horses, which typically have a much softer coat, more sensitive skin and sweat considerably less than, for example, black horses. Due to the softness of their coat, such horses can effectively become a magnet to dust.

In at least some examples, in addition to brushing with the first and second brushes 226, 228, the second grooming regime 24*b* for the second category of horse comprises the penultimate brushing step 30*b* of brushing with the penultimate brush 230 and the final brushing step 32*b* of brushing with the final brush 232. Accordingly, the second grooming regime 24*b* preferably comprises at least four specific grooming steps 26*b*, 28*b*, 30*b*, 32*b* with at least four prescribed specific brushes 226, 228, 230, 232. The second grooming regime 24*b* is adapted for horses that have hair that is soft or smooth when brushed in both directions, such with and against the hair.

Preferably, the regime 24*a*, 24*b*, 24*c* comprises a type-specific brush not configured or not necessarily configured for the horse being groomed and/or for the category of horse of that regime 24*a*, 24*b*, 24*c* or corresponding kit 10, 210, 310. For example, as described in detail below, the regime 24*c* and corresponding kit 310 for grooming black and dark bay horses preferably comprises at least one brush configured for non-black/dark bay horses. Here, the regime 24*c* and corresponding kit 310 for grooming black and dark bay horses preferably comprises a brush 328 configured for a Lippizaner horse type, similar to the second brush 128 of the first grooming kit 110.

Optionally the grooming regime 24*a*, 24*b*, 24*c* may comprise an additional intermediate grooming step. For example, the third grooming regime 24*c* as shown in FIG. 5, using the grooming kit 310 of FIG. 8, comprises an additional intermediate grooming step 29*c* between the second grooming step 28*c* and the penultimate grooming step 30*c*.

Figure 5:
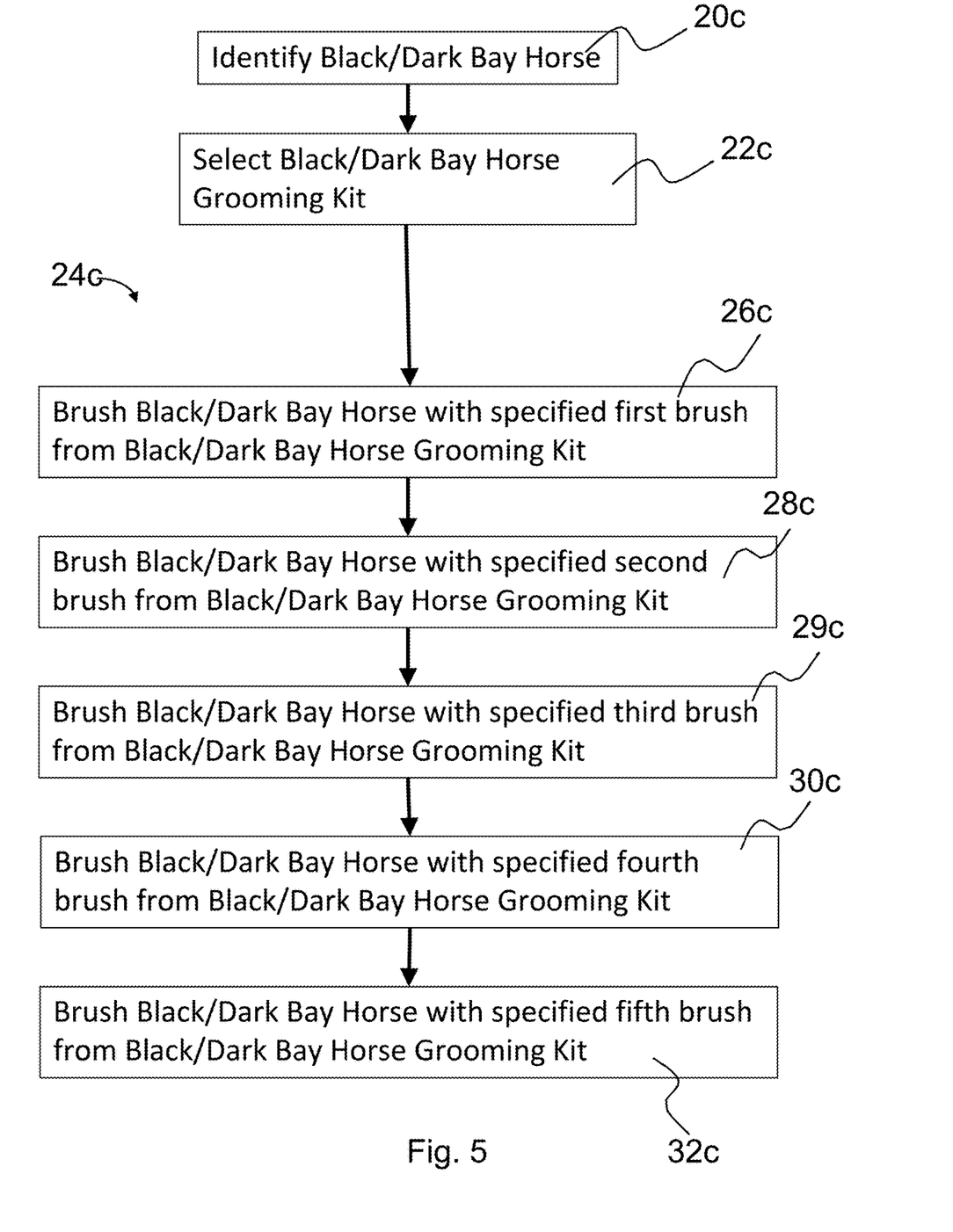
FIG. 5 is a flow chart depicting a method of grooming a horse of a third category in accordance with an example of the present disclosure.

As shown in FIG. 5, in at least some examples, the method comprises grooming a horse with a coat corresponding to the third category according to a third grooming regime 24*c* as prescribed in instructions 340. Here, the third grooming regime 24*c* corresponds to a black/dark bay horse coat grooming regime 24*c*. The third grooming regime 24*c* comprises brushing the horse sequentially with at least five successive steps 26*c*, 28*c*, 29*c*, 30*c*, 32*c* with at least five different types of brush 326, 328, 329, 330, 332, as described in detail below with reference to FIG. 8.

The third grooming regime 24*c* is adapted for horses that have tough or coarse hair when brushed in both directions, such as both with and against the hair. Black and dark bay horses have short, sturdy coats and due to their color they produce a lot of oil. The pores can become blocked and as a result, the coat will not benefit from optimal nutrition as it should. Moreover, black and dark bay horses sweat a lot and when this sweat locks in with oil it can become very hard to be removed by brushing. The grooming regime 24*c* of FIG.

5 and the corresponding grooming kit 310 of FIG. 8 is specifically configured to groom black or dark bay horses to address such sweat and oil issues, enabling removal of excess oil and preventing or at least mitigating blockage of pores. The grooming kit 310 for the black/dark bay horse includes at least five distinct brushes 326, 328, 329, 330, 332 that help ensure that all dirt and non-essential oil on the skin is removed and only a healthy amount of oil is left. Preferably the brushes 326, 328, 329, 330, 332 do not remove all of the horse's natural oils from their hair, such that the horse is still protected from weather conditions.

In at least some examples, the first brush 326 for black/dark bay horses of the third category for use in the first grooming step 26c of the third grooming regime 24c comprises a dust and matt removal brush. In at least some examples, the first brush 326 comprises at least two different types of bristles. Here the first brush 326 comprises gray and black horse hair bristles. Optionally the first brush 326 for the third category of horse comprises bristles of at least two different lengths. Here, the first brush 326 for the third category of horse comprises a border of bristles of gray horse hair around a periphery of the brushing portion compared to black horse hair bristles in a central area of the brushing portion within the border. Preferably the first brush 326 for the third category of horse for the first grooming step 26c of the third grooming regime 24c comprises a horse brush made by Haas Manufaktur and marketed in 2016 as a "Parcour" brush available from Eqclusive Limited.

In at least some examples, the second brush 328 of the third grooming regime 24c corresponds to the second brush 128 of the first grooming regime 24a. Here, the second brush 328 is the Lippizaner horse brush made by Haas Manufaktur and marketed in 2016 as a "Lipipizaner" brush available from Eqclusive Limited. The inventor of the present application has achieved remarkable grooming results by incorporating such a Lipizzaner horse brush in the specific grooming regime 24c for a black/dark bay horse.

In at least some examples, the additional intermediate grooming step 29c between the second grooming step 28c and the penultimate grooming step 30c comprises brushing with an intermediate grooming brush 329 that corresponds to the second brush 228 of the second grooming regime 24b. Here, the intermediate grooming brush 329 is the brush made by Haas Manufaktur and marketed in 2016 as a "Cavaliere" brush available from Eqclusive Limited.

In at least some examples, in addition to brushing with the first, second and intermediate brushes 326, 328, 329 the third grooming regime 24c for the third category of horse comprises the penultimate brushing step 30c of brushing with the penultimate brush 330 and the final brushing step 32c of brushing with the final brush 332. Accordingly, the third grooming regime 24c preferably comprise at least five specific grooming steps 26c, 28c, 29c, 30c, 32c with at least five prescribed specific brushes 326, 328, 329, 330, 332.

Preferably all brushes are made of ethically-sourced horse hair, such that they may produce outstanding results when it comes to grooming. In at least some examples, the regimes 24a, 24b, 24c and associated kits 110, 210, 310 promote a healthy coat that produces a natural shine and nourishment, which both help with the growth of hair. Preferably, by using brushes that consist of horse hair bristles, the kits 110, 210, 310 ensure that the horse's skin receives a massage—this enhances the circulation. Furthermore, horse hair bristles ensure that a horse's coat that is perhaps too sturdy or fluffy becomes smoother—with that, it receives more vitamins, nourishment from the root to tip. Preferably, all grooming regimes 24a, 24b, 24c, with all those brushes used in the right order, minimizes any skin problems and ensures the throughout shine of the horse without necessarily requiring any sprays or losing any needed natural oil.

Figure 9:
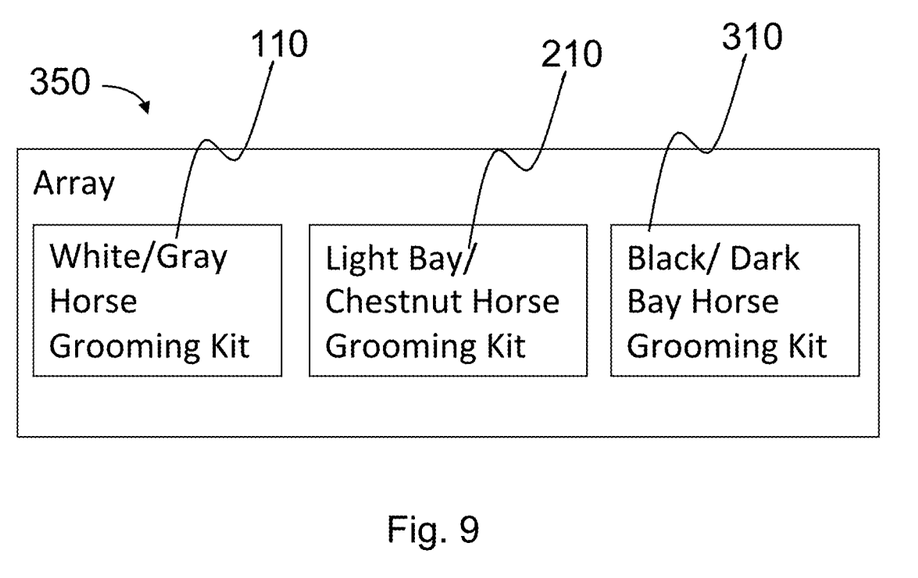
FIG. 9 is a schematic illustration of an array comprising the kits of FIGS. 6, 7 and 8.

FIG. 9 is a schematic illustration of an array 350 comprising the kits 110, 210, 310 of FIGS. 6, 7 and 8.

Figure 10:
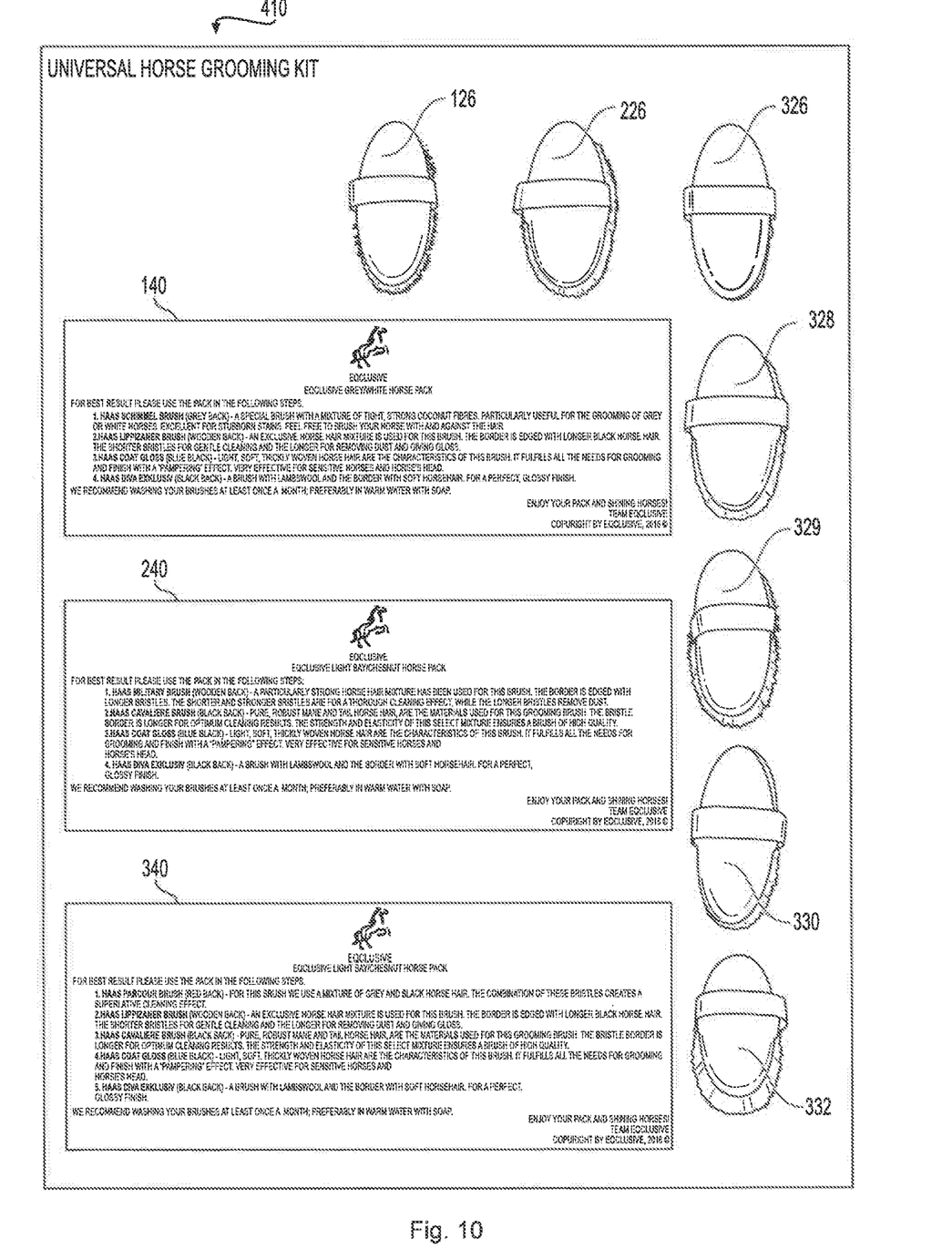
FIG. 10 is a schematic illustration of a universal kit for grooming a horse of any of the first, second and third categories in accordance with an example of the present disclosure.

FIG. 10 shows a schematic illustration of a universal kit 410 for grooming a horse of any of the first, second and third categories in accordance with an example of the present disclosure. Here the universal kit comprises a brush of each type required for all of the first, second and third categories of horse. Accordingly the kit 410 comprises at least: the first brush 126 of the first grooming regime 24a; the first brush 226 of the second grooming regime 24b and all of the brushes 326, 328, 329, 330, 332 of the third grooming regime 24c. It will be appreciated that the kit 410 preferably comprises instructions 440 comprising each of the instructions 140, 240, 340 of the kits 110, 210, 310 of FIGS. 6, 7 and 8 respectively.

It will also be appreciated that in other example universal kits, a selection of brushes may be provided for grooming another plurality of categories of horse. For example, a kit for the second and third categories of horse may comprise all of the brushes of the kit of FIG. 10 with the exception of not comprising the Schimmel brush, which is only required for grooming horses of the first category.

Although not shown in FIG. 10 or any other figure, other example kits may comprise fewer brushes, such as fewer brushes than specified in any of the regimes 24a, 24b, 24c. For example, another kit for a first category of horse may comprise only two or three of the brushes 126, 128, 130, 132 shown in FIG. 6. Preferably such a kit comprises all brushes specific to the particular category of horse. Such a kit may omit or not comprise one or more of the brushes 130, 132, 230, 232, 330, 332 generic to each regime 24a, 24b, 24c and kit 110, 210, 310. For example, such a kit for the first category of horse may comprise only the first and second brushes 126, 128.

In at least some examples, brushes generic or common to more than one grooming regime 24a, 24b, 24c may be comprised in a generic kit. For example, a generic finishing kit may comprise at least two generic brushes, such as a singular example of the penultimate brush 130, 230, 330 and a singular example of the final brush 132, 232, 332.

It will also be appreciated that in other kits multiple brushes of a single type may be provided. For example, in at least some example kits one or more pairs of a single type of brush may be provided. The multiple brush/es of a single type may comprise one or more of the final and/or penultimate brush 132, 232, 332, 130, 230, 330. For example, at least one example of the universal kit 410 of FIG. 10 may comprise pairs of both the final and penultimate brush 132, 232, 332, 130, 230, 330. Where such a kit may be used on multiple categories of horse, the brushes common to multiple categories of horse may be used relatively more, such as to incur a disproportionate or quicker level of wear. Accordingly, the provision of multiple brushes of such types of brush 132, 232, 332, 130, 230, (and/or brushes 126, 228, 328, 329 in other examples) may ensure a more even wear of brushes in such a kit, so as to promote a longer lifespan of the total kit.

Each grooming regime 24a, 24b, 24c may comprise cleaning one or more brushes, such as during use of the one or more brushes. Preferably, the one or more brushes is/are cleaned during the use step of that brush in the grooming regime, such as between every few strokes. Preferably a curry comb, such as a soft, rubber curry comb, is used to clean the one or more brushes. In contrast to, for example, a metal curry comb, use of a soft, non-metallic curry comb may help maintain the brush, such as without damaging the bristles of the brush. Whereas a metal curry comb may be more likely to damage bristles of the brush, a softer, non-metallic curry comb may clean dirt from the brush without damaging the bristles. Particularly where the brush may comprise animal hairs, such as horse hair, then a soft curry comb intended for grooming such a coat of animal hair may provide a better cleaning of the brush, without damaging the bristles.

In addition, each method may comprise washing the brushes at least once a month; preferably in warm water with soap.

Figure 11:
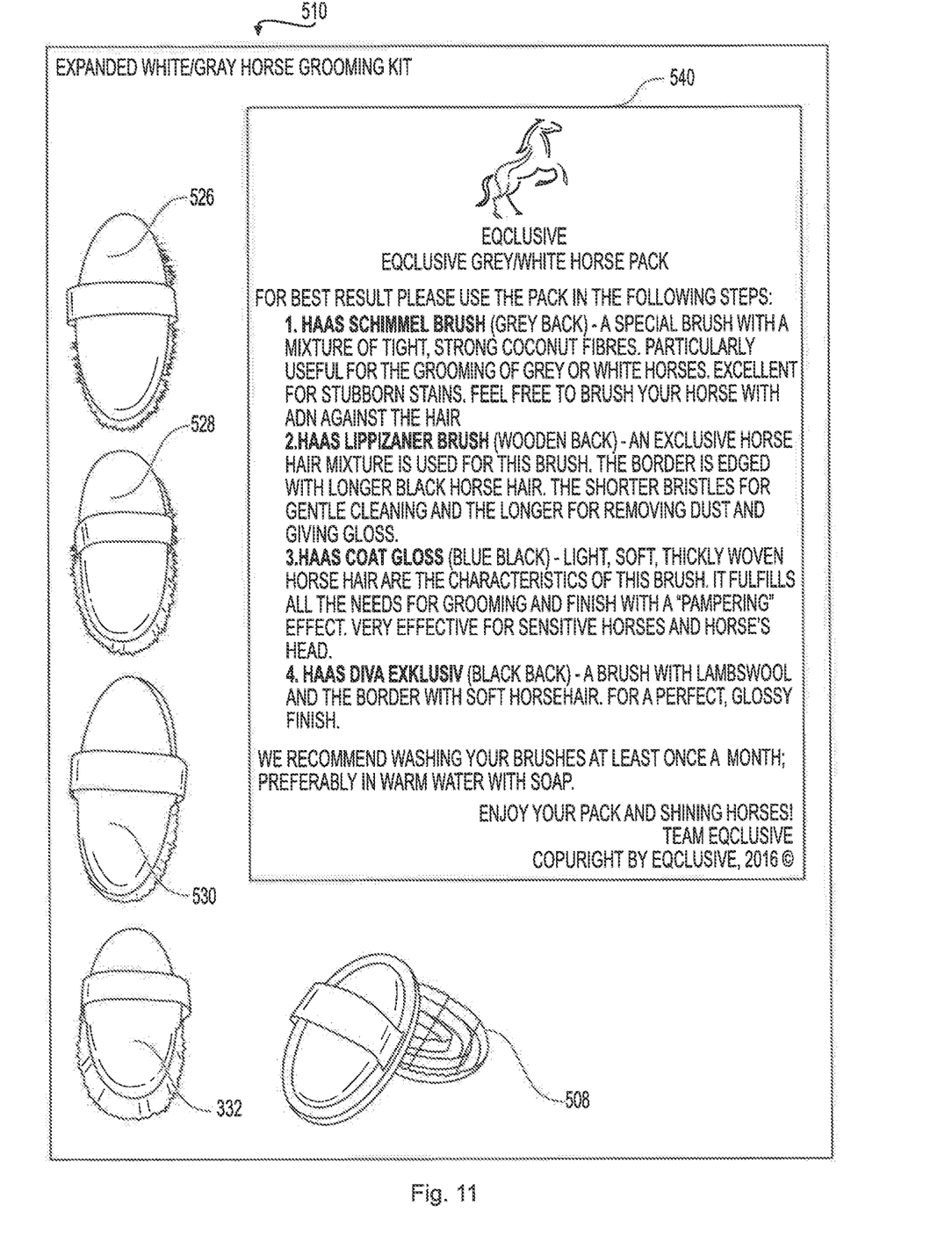
FIG. 11 is a schematic illustration of a further kit for grooming a horse of the first category in accordance with an example of the present disclosure.

Optionally, each grooming regime may comprise a pre-brushing step of preparing the horse coat. The pre-brushing step may comprise rubbing the horse coat with a curry comb, such as the soft, rubber curry comb 508 of FIG. 11. In FIG. 11, there is shown a horse grooming kit 510 generally similar to that 110 shown in FIG. 6. Similar features are denoted by similar reference numerals incremented by 400. Accordingly, the grooming kit 510 comprises a penultimate brush 530 and a final brush 532. It will be appreciated that in at least some example grooming regimes the curry comb 508 is not used in a pre-brushing step, but merely to clean one or more of the other brushes of the kit.

Optionally, each grooming regime may comprise one or more post-brushing steps. For example, subsequent to brushing with the polishing brush, the grooming regime may comprise applying a treatment, such as a conditioner, to the horse. Accordingly, at least some example kits may comprise additional apparatus, such as selected from one or more of: conditioner/s; curry comb/s; mane/tail brushes; oil/s.

It will be appreciated that any of the aforementioned apparatus may have other functions in addition to the mentioned functions, and that these functions may be performed by the same apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features. It should be understood that the embodiments described herein are merely exemplary and that various modifications may be made thereto without departing from the scope or spirit of the invention. For example, it will be appreciated that although shown here as packs of singular brushes, multiple brushes of a particular type may be provided in other examples of kits (e.g. where a pair/s of a/each type of brush may be provided).

Following from the above description, it should be apparent to those of ordinary skill in the art that, while the methods and apparatuses herein described constitute exemplary embodiments of the present invention, the invention described herein is not limited to any precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of grooming a horse, the method comprising selecting a grooming kit according to a horse attribute sorted among a plurality of categories including:
    a first category corresponding to a gray or white horse coat type;
    a second category corresponding to a light bay or chestnut horse coat type;
    a third category corresponding to a black or dark bay horse coat type;
the method comprises following a prescribed sequential grooming regime according to which of the plurality of categories the horse attribute is sorted in and the selected grooming kit;
each particular grooming regime comprising an initial brushing step with a specified first brush type prescribed as an initial brush for that particular grooming regime;
each particular grooming regime comprising a second brushing step with a specified second brush type prescribed as a second brush for that particular grooming regime;
wherein each regime comprises a unique combination of first and second brushing steps with a unique combination of types of first and second sequential brushes;
each grooming regime further comprising a further brushing step, the further brushing step comprising a penultimate brushing step with a specified penultimate brush type prescribed as a penultimate brush for that particular grooming regime, at least one of the regimes comprising performing the penultimate brushing step with a same specified penultimate brush type as the specified penultimate brush type of at least one of the other regimes; and
each grooming regime further comprises a final brushing step of brushing with a specified final brush type prescribed as a final brush for that particular grooming regime, at least one of the regimes comprising a same specified final brush type as the specified final brush type of at least one of the other regimes.

2. The method of claim 1, wherein at least one of the regimes comprises performing the first brushing step with a different specified initial brush type from the specified initial brush type of at least one of the other regimes.

3. The method of claim 1, wherein at least one of the regimes comprises performing the second brushing step with a different specified second brush type from the specified second brush type of at least one of the other regimes.

4. The method of claim 1, wherein each regime comprises performing each penultimate brushing step with the same specified penultimate brush type as each of the other regimes.

5. The method of claim 4, wherein the same specified penultimate brush type is made purely of gray horses' hair.

6. The method of claim 1, wherein each regime comprises performing each final brushing step with the same specified final brush type as each of the other regimes.

7. The method of claim 6, wherein the same specified final brush type comprises a brush with a border of bristles of black horse hair around a periphery of a brushing portion with a lambswool center in a central area of the brushing portion.

8. The method of claim 1, wherein the method comprise the horse attribute comprises a hair thickness or length or a coat thickness.

9. The method of claim 1, wherein each grooming regime comprises brushing the horse with at least two different types of brush configured for a particular type of horse.

10. A first horse grooming kit for the method of claim 1, the first horse grooming kit being adapted for the grooming regime for the first category of horse attribute, wherein the first brush type for the first category of horse attribute comprises coconut fibers; and the second brush type for the first category of horse attribute comprises a border of bristles of longer black horse hair around a periphery of a brushing portion compared to shorter gray and brown horse hair bristles in a central area of the brushing portion within the border.

11. A second horse grooming kit for the method of claim 1, the second horse grooming kit being adapted for the grooming regime for the second category of horse attribute,
  wherein the first brush type for the second category of horse attribute comprises a border of bristles of longer black/brown horse hair around a periphery of a brushing portion compared to shorter black/brown horse hair bristles in a central area of the brushing portion within the border; and
  the second brush type for the second category of horse attribute comprises a border of bristles of longer white/gray horse hair around a periphery of a brushing portion compared to shorter black horse hair bristles in a central area of the brushing portion within the border.

12. A third horse grooming kit for the method of claim 1, the third horse grooming kit being adapted for the grooming regime for the third category of horse, corresponding to the black or dark bay horse coat type;
  wherein the first brush type for the third category of horse attribute comprises a border of bristles of gray horse hair around a periphery of a brushing portion compared to black horse hair bristles in a central area of the brushing portion within the border; and
  the second brush type for the third category of horse attribute comprises a border of bristles of longer black horse hair around a periphery of a brushing portion compared to shorter gray and brown horse hair bristles in a central area of the brushing portion within the border; and
  an intermediate grooming brush type for the third category of horse attribute for an intermediate brushing step after the second brushing step, the intermediate brush type comprising a border of bristles of longer white/gray horse hair around a periphery of a brushing portion compared to shorter black horse hair bristles in a central area of the brushing portion within the border.

13. An array of horse grooming kits for the method of claim 1, the array comprising:
  a first horse grooming kit for the method of claim 1, the first horse grooming kit being adapted for the grooming regime for the first category of horse attribute, wherein the first brush type for the first category of horse attribute comprises coconut fibers; and the second brush type for the first category of horse attribute comprises a border of bristles of longer black horse hair around a periphery of a brushing portion compared to shorter gray and brown horse hair bristles in a central area of the brushing portion within the border; and
  a second horse grooming kit for the method of claim 1, the second horse grooming kit being adapted for the grooming regime for the second category of horse attribute; wherein the first brush type for the second category of horse attribute comprises a border of bristles of longer black/brown horse hair around a periphery of a brushing portion compared to shorter black/brown horse hair bristles in a central area of the brushing portion within the border; and wherein the second brush type for the second category of horse attribute comprises a border of bristles of longer white/gray horse hair around a periphery of a brushing portion compared to shorter black horse hair bristles in a central area of the brushing portion within the border; and
  a third horse grooming kit for the method of claim 1, the third horse grooming kit being adapted for the grooming regime for the third category of horse, corresponding to the black or dark bay horse coat type; wherein the first brush type for the third category of horse attribute comprises a border of bristles of gray horse hair around a periphery of a brushing portion compared to black horse hair bristles in a central area of the brushing portion within the border; and
  wherein the second brush type for the third category of horse attribute comprises a border of bristles of longer black horse hair around a periphery of a brushing portion compared to shorter gray and brown horse hair bristles in a central area of the brushing portion within the border.

14. The array of claim 13, wherein each of the first, second and third horse grooming kits further comprises a penultimate brush type for the penultimate brushing step, and wherein the penultimate brush type is made purely of gray horses' hair.

15. The array of claim 13, wherein each of the first, second and third horse grooming kits further comprises a final brush type for the final brushing step, and wherein the final brush type comprises a brush with a border of bristles of black horse hair around a periphery of a brushing portion with a lambswool center in a central area of the brushing portion.

16. The method of claim 1, wherein at least one of the regimes comprises performing the first brushing step with a different specified initial brush type from the specified initial brush type of at least one of the other regimes;
  wherein at least one of the regimes comprises performing the second brushing step with a different specified second brush type from the specified second brush type of at least one of the other regimes; and
  wherein each regime comprises performing each penultimate brushing step with the same specified penultimate brush type as each of the other regimes, the same specified penultimate brush type being made purely of gray horses' hair.

17. The method of claim 1, wherein at least one of the regimes comprises performing the first brushing step with a different specified initial brush type from the specified initial brush type of at least one of the other regimes;
  wherein each regime comprises performing each final brushing step with the same specified final brush type as each of the other regimes, the same specified final brush type comprising a brush with a border of bristles of black horse hair around a periphery of a brushing portion with a lambswool center in a central area of the brushing portion.

18. The method of claim 1, wherein at least one of the regimes comprises performing the first brushing step with a different specified initial brush type from the specified initial brush type of at least one of the other regimes;

wherein the horse attribute comprises at least one of: a hair thickness; a hair length; and a coat thickness; and wherein each grooming regime comprises brushing the horse with at least two different types of brush configured for a particular type of horse.

19. The method of claim 1, wherein at least one of the regimes comprises performing the first brushing step with a different specified initial brush type from the specified initial brush type of at least one of the other regimes; and the method comprises providing:

a first horse grooming kit adapted for the grooming regime for the first category of horse attribute, wherein the first brush type for the first category of horse attribute comprises coconut fibers; and the second brush type for the first category of horse attribute comprises a border of bristles of longer black horse hair around a periphery of a brushing portion compared to shorter gray and brown horse hair bristles in a central area of the brushing portion within the border;

a second horse grooming kit adapted for the grooming regime for the second category of horse attribute, wherein the first brush type for the second category of horse attribute comprises a border of bristles of longer black/brown horse hair around a periphery of a brushing portion compared to shorter black/brown horse hair bristles in a central area of the brushing portion within the border; and the second brush type for the second category of horse attribute comprises a border of bristles of longer white/gray horse hair around a periphery of a brushing portion compared to shorter black horse hair bristles in a central area of the brushing portion within the border; and a third horse grooming kit adapted for the grooming regime for the third category of horse, corresponding to the black or dark bay horse coat type; wherein the first brush type for the third category of horse attribute comprises a border of bristles of gray horse hair around a periphery of a brushing portion compared to black horse hair bristles in a central area of the brushing portion within the border; and the second brush type for the third category of horse attribute comprises a border of bristles of longer black horse hair around a periphery of a brushing portion compared to shorter gray and brown horse hair bristles in a central area of the brushing portion within the border; and an intermediate grooming brush type for the third category of horse attribute for an intermediate brushing step after the second brushing step, the intermediate brush type comprising a border of bristles of longer white/gray horse hair around a periphery of a brushing portion compared to shorter black horse hair bristles in a central area of the brushing portion within the border.

20. The method of claim 1, wherein at least one of the regimes comprises performing the first brushing step with a different specified initial brush type from the specified initial brush type of at least one of the other regimes; and the method comprises providing:

an array of horse grooming kits for the method of claim 1; and the array comprises:

a first horse grooming kit for the method of claim 1, the first horse grooming kit being adapted for the grooming regime for the first category of horse attribute, wherein the first brush type for the first category of horse attribute comprises coconut fibers; and the second brush type for the first category of horse attribute comprises a border of bristles of longer black horse hair around a periphery of a brushing portion compared to shorter gray and brown horse hair bristles in a central area of the brushing portion within the border;

a second horse grooming kit for the method of claim 1, the second horse grooming kit being adapted for the grooming regime for the second category of horse attribute; wherein the first brush type for the second category of horse attribute comprises a border of bristles of longer black/brown horse hair around a periphery of a brushing portion compared to shorter black/brown horse hair bristles in a central area of the brushing portion within the border; and wherein the second brush type for the second category of horse attribute comprises a border of bristles of longer white/gray horse hair around a periphery of a brushing portion compared to shorter black horse hair bristles in a central area of the brushing portion within the border; and a third horse grooming kit for the method of claim 1, the third horse grooming kit being adapted for the grooming regime for the third category of horse, corresponding to the black or dark bay horse coat type; wherein the first brush type for the third category of horse attribute comprises a border of bristles of gray horse hair around a periphery of a brushing portion compared to black horse hair bristles in a central area of the brushing portion within the border; and wherein the second brush type for the third category of horse attribute comprises a border of bristles of longer black horse hair around a periphery of a brushing portion compared to shorter gray and brown horse hair bristles in a central area of the brushing portion within the border;

wherein each of the first, second and third horse grooming kits further comprises a penultimate brush type for the penultimate brushing step, and wherein the penultimate brush type is made purely of gray horses' hair; and further wherein each of the first, second and third horse grooming kits further comprises a final brush type for the final brushing step, and wherein the final brush type comprises a brush with a border of bristles of black horse hair around a periphery of a brushing portion with a lambswool center in a central area of the brushing portion.

* * * * *